US012752455B2

(12) United States Patent
Yang

(10) Patent No.: US 12,752,455 B2
(45) Date of Patent: Oct. 6, 2026

(54) COLLAPSIBLE WOVEN BASKET AND METHOD OF MAKING SAME

(71) Applicant: Seville Classics Inc., Torrance, CA (US)

(72) Inventor: Chi-Jeh Yang, Changhua County (TW)

(73) Assignee: Seville Classics Inc., Torrance, CA (US)

(*) Notice: Subject to any disclaimer, the term of this patent is extended or adjusted under 35 U.S.C. 154(b) by 317 days.

(21) Appl. No.: 18/381,919

(22) Filed: Oct. 19, 2023

(65) Prior Publication Data

US 2025/0128449 A1 Apr. 24, 2025

(51) Int. Cl.
*B27J 1/02* (2006.01)
*A47G 29/06* (2006.01)

(52) U.S. Cl.
CPC ................ *B27J 1/02* (2013.01); *A47G 29/06* (2013.01)

(58) Field of Classification Search
CPC .. A47G 29/06; B27J 1/02; B65D 7/26; B65D 11/1846; B65D 15/24; A47B 47/0083; A47B 47/06
See application file for complete search history.

(56) References Cited

U.S. PATENT DOCUMENTS 1,576,191 A * 3/1926 Jelleme ................ D03D 1/0043 147/48
4,498,598 A * 2/1985 Bae .......................... B65D 7/26 217/14

* cited by examiner

*Primary Examiner* — Andrew T Kirsch
(74) *Attorney, Agent, or Firm* — Raymond Sun

(57) ABSTRACT

A method is provided for making a collapsible woven basket which has four frame members. According to the method, the right side of each frame member is connected to the left side of an adjacent frame member to form pivoting connections. Vertical bands are formed by wrapping a vertical strip of material around the top and bottom sides of the four frame members in a manner where a vertical space is defined between adjacent vertical bands. Next, horizontal bands are formed by threading a horizontal strip of material inside and outside adjacent vertical bands in each frame member, with this threading starting from adjacent the bottom side of the first frame member and repeated to the top side for each frame member. With this method of forming vertical and horizontal bands, each horizontal band covers each pivoting connection between adjacent frame members.

3 Claims, 16 Drawing Sheets

COLLAPSIBLE WOVEN BASKET AND METHOD OF MAKING SAME

BACKGROUND OF THE INVENTION

1. Field of the Invention

The present invention relates to a collapsible woven basket or hamper, and in particular, to a method for weaving the basket or hamper that can be collapsed.

2. Description of the Prior Art

The recent trend for household storage items is to provide baskets, hampers, racks and other containers that can be collapsed into a smaller configuration so that they can be more easily shipped or packed when they are not in use.

There are currently a number of collapsible baskets and hampers that are available in the marketplace. These collapsible baskets and hampers are foldable about their connecting edges so that they can be folded and collapsed into a smaller configuration. The smaller configuration means that the packaging can be made smaller, and also facilitates less expensive shipping as the product occupies less space.

For these collapsible baskets and hampers, cloth and meshed materials are often used for their sidewalls, but cloth and meshed materials are not durable and cannot tolerate too much wear and tear. As a result, collapsible baskets and hampers are also being made with bamboo or sturdier materials for the side walls. These collapsible baskets and hampers are often woven with strips of bamboo or a similar sturdy material. When weaving the strips of bamboo in making these collapsible baskets or hampers, the pivoting or folding edges between each adjacent sidewall have a noticeable and sizeable gap to facilitate the easy folding of the sidewalls against each other. However, these gaps between adjacent sidewalls are not desirable when the hamper or basket is in use.

SUMMARY OF THE DISCLOSURE

It is an object of the present invention to provide a collapsible woven basket or hamper that can be easily folded and collapsed while minimizing the gap between adjacent sidewalls.

It is another object of the present invention to provide a method for weaving a collapsible basket or hamper that minimizes the gap between adjacent sidewalls.

The objectives of the present invention are accomplished by providing a method of making a collapsible woven basket which has a first frame member, a second frame member, a third frame member and a fourth frame member, with each frame member having a left side, a right side, a bottom side and a top side. According to the method, the right side of each frame member is connected to the left side of an adjacent frame member to form pivoting connections. Vertical bands are formed by wrapping a vertical strip of material around the top and bottom sides of the four frame members in a manner where a vertical space is defined between adjacent vertical bands. Next, horizontal bands are formed by threading a horizontal strip of material inside and outside adjacent vertical bands in the first frame member, and then continuing to thread the horizontal strip of material inside and outside adjacent vertical bands in the second frame member, the third frame member and the fourth frame member, with this threading starting from adjacent the bottom side of the first frame member and repeated to the top side for each frame member. With this method of forming vertical and horizontal bands, each horizontal band covers each pivoting connection between adjacent frame members.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices and mechanisms are omitted so as to not obscure the description of the present invention with unnecessary detail.

FIGS. 1-4 illustrate one embodiment of a collapsible woven basket 100 according to the present invention. Even though the invention is illustrated herein in connection with a basket, it is possible to use the same structural elements and apply the same steps to provide a collapsible woven hamper or other similar container.

Figure 5:
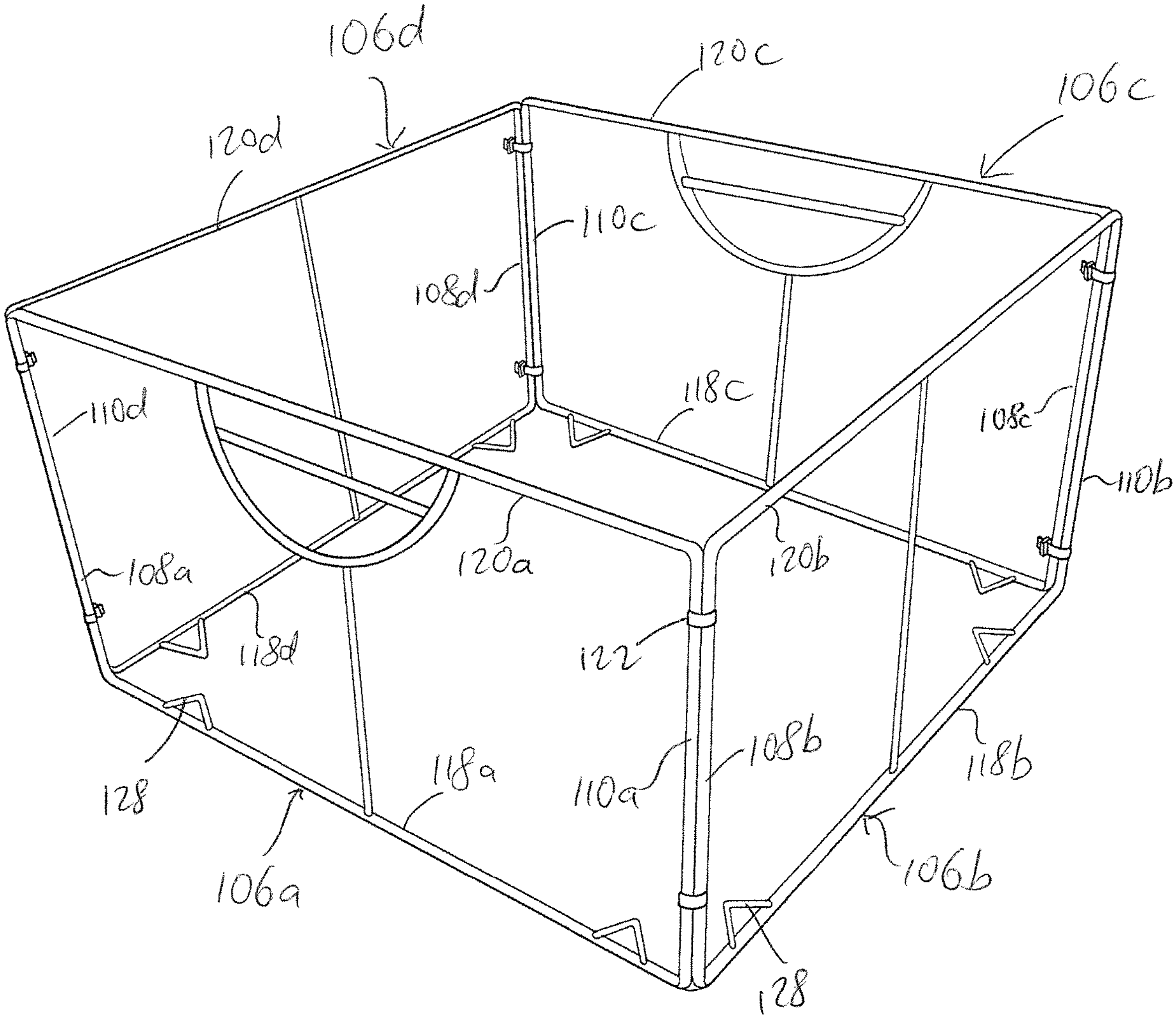
FIG. 5 is a perspective view of the underlying frame members of the basket of FIG. 1.

The basket 100 has four side members 102*a*, 102*b*, 102*c* and 102*d*, with two opposite side members 102*a* and 102*c* having an opening 104*a* and 104*c* adjacent the upper edge thereof to function as handles. Each side member 102*a*-102*d* has an underlying frame member 106*a*-106*d*, respectively. See FIG. 5. Each side member 102*a*-102*d* has a left side 108*a*-108*d*, a right side 110*a*-110*d*, a bottom side 118*a*-118*d* and a top side 120*a*-120*d*. The four side members 102*a*-102*d* are pivotably connected to each other in a manner where each frame member (e.g., 106*a*) has two opposite sides (e.g., left side 108*a* and right side 110*a* as shown in FIG. 5) that are pivotably connected to sides (e.g., right side 110*d* and left side 108*b*) of two adjacent frame members (e.g., 106*d* and 106*b*), respectively. In addition, a ringed connector 122 can be used to pivotably connect the two adjacent sides (e.g., right side 110*a* and left side 108*b*) of two adjacent frame members 106*a* and 106*b*. Each ringed connector 122 can be cut and removed after the weaving of the strip(s) 112 as described below has been completed.

Figure 1:
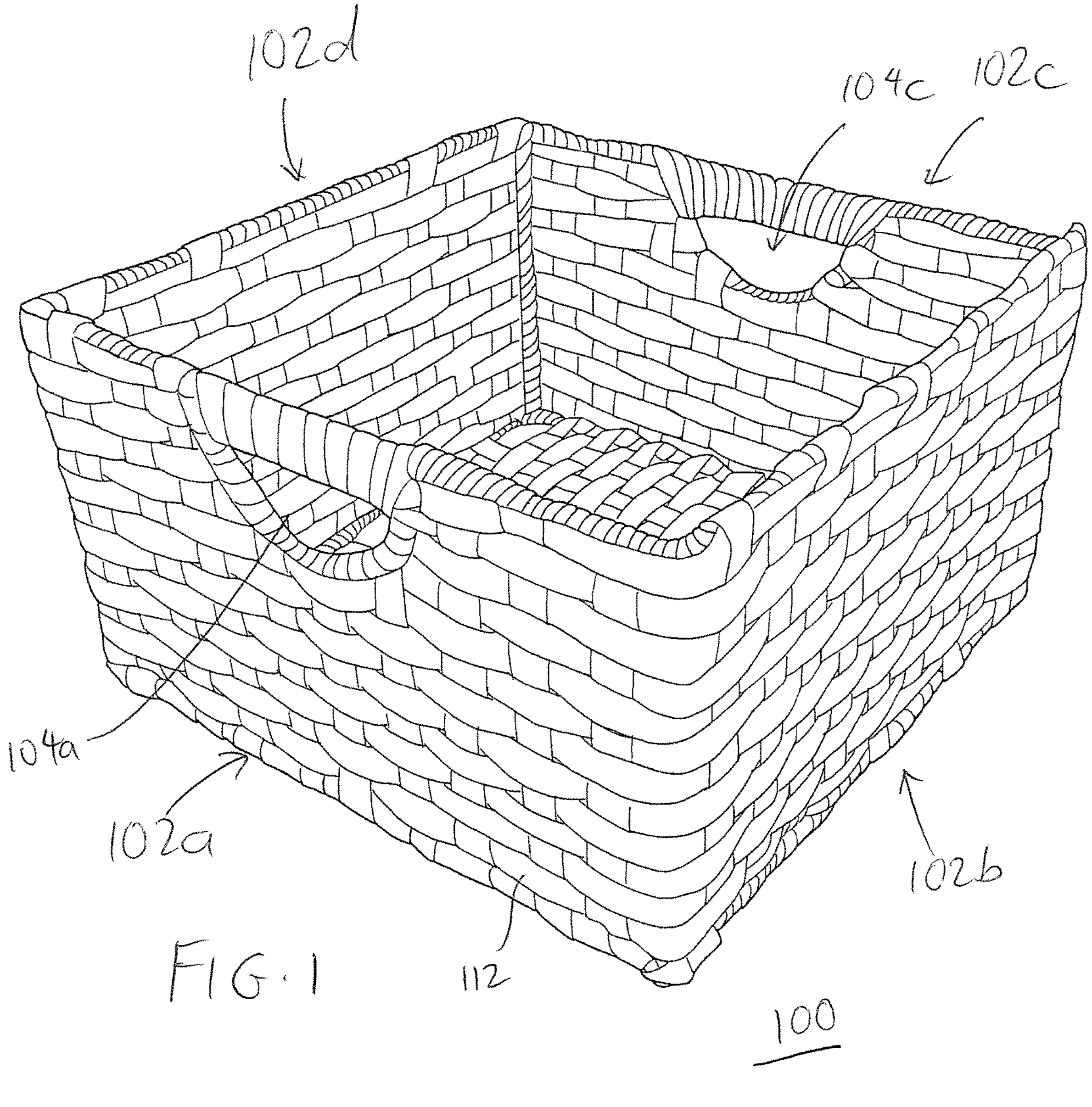
FIG. 1 is a perspective view of a woven basket according to the present invention.
Figure 2:
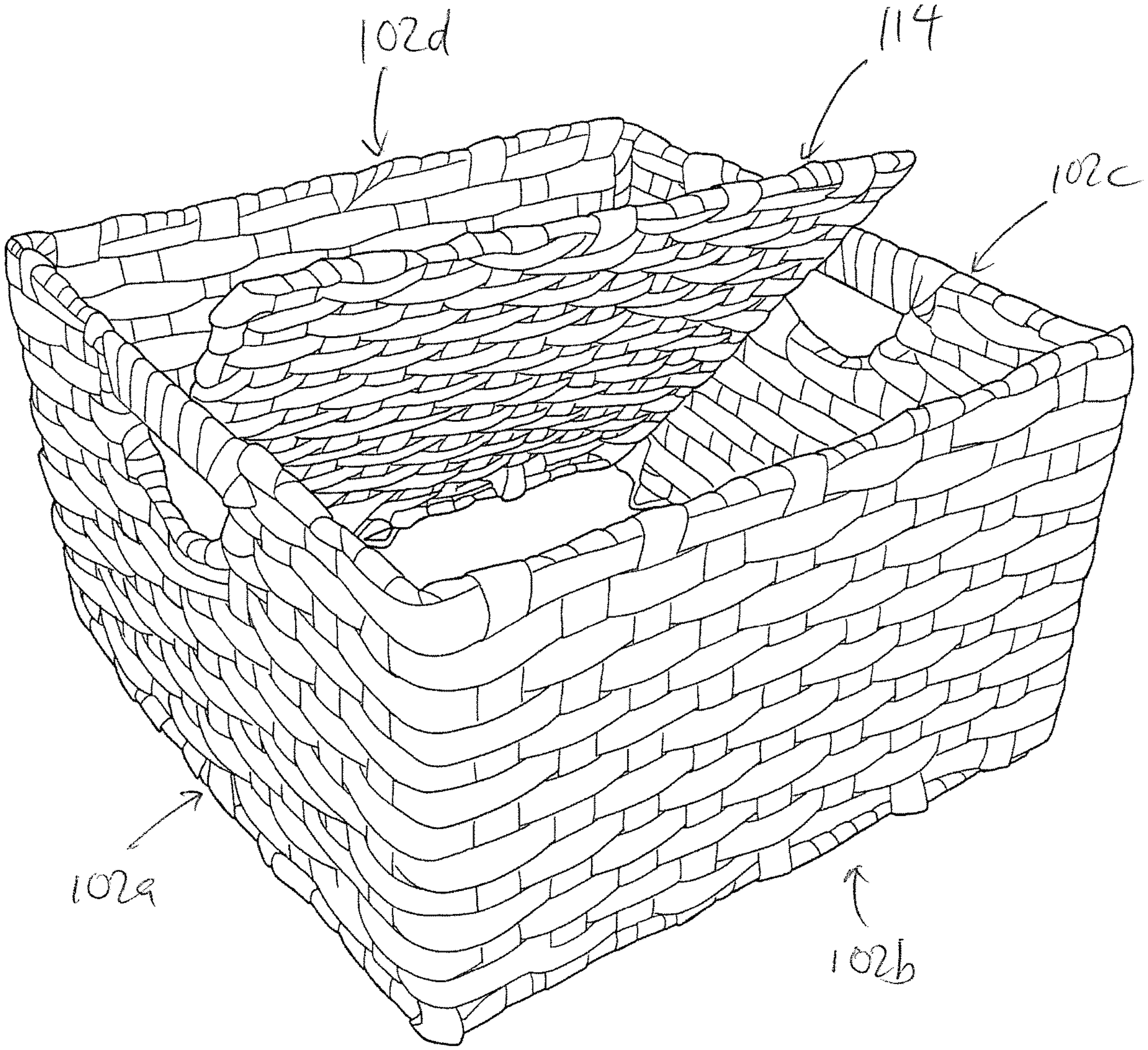
FIG. 2 is a perspective view of the basket of FIG. 1 showing the base lifted up.
Figure 3:
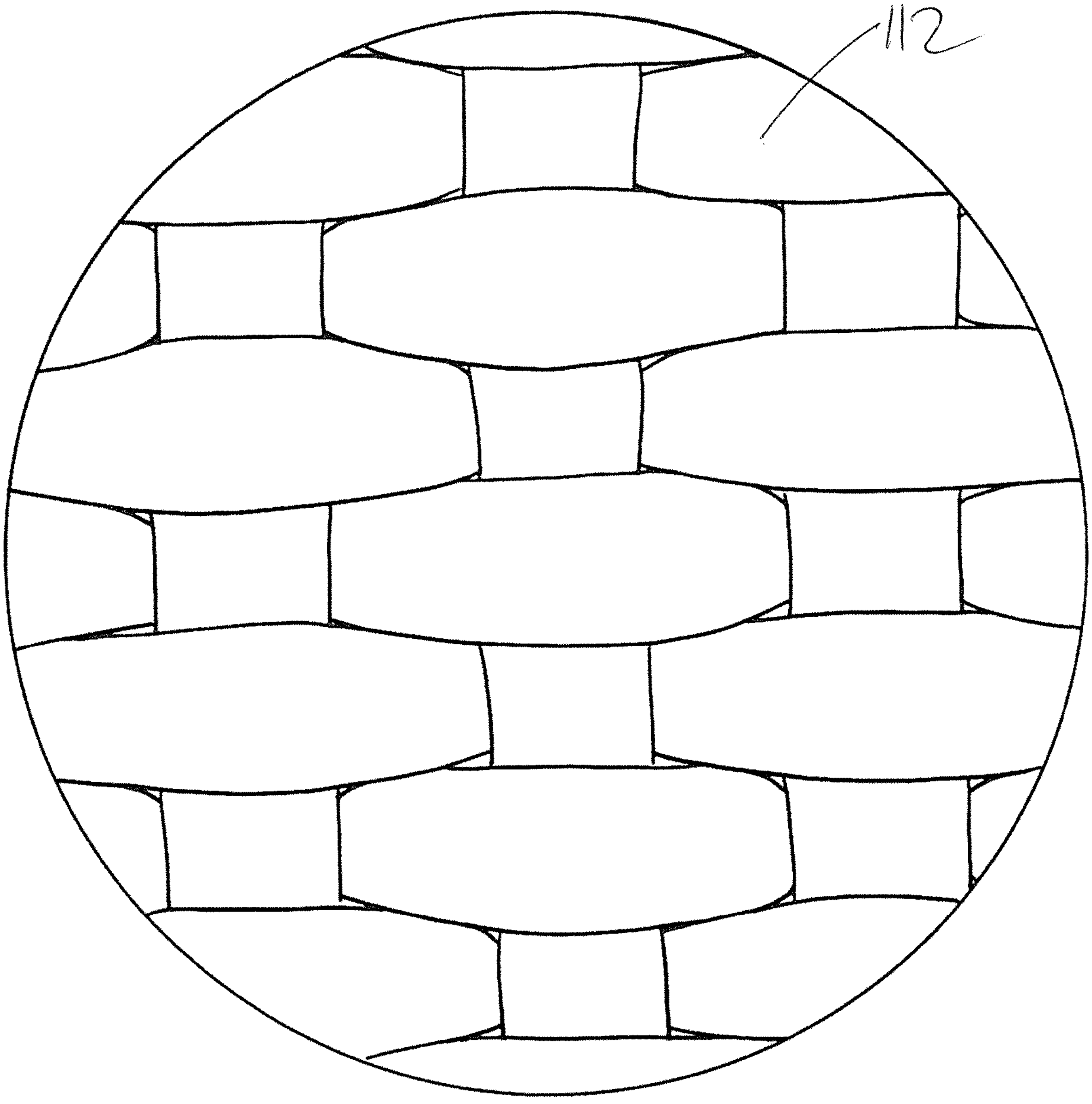
FIG. 3 is an enlarged view of the weave pattern of the basket of FIG. 1.
Figure 4:
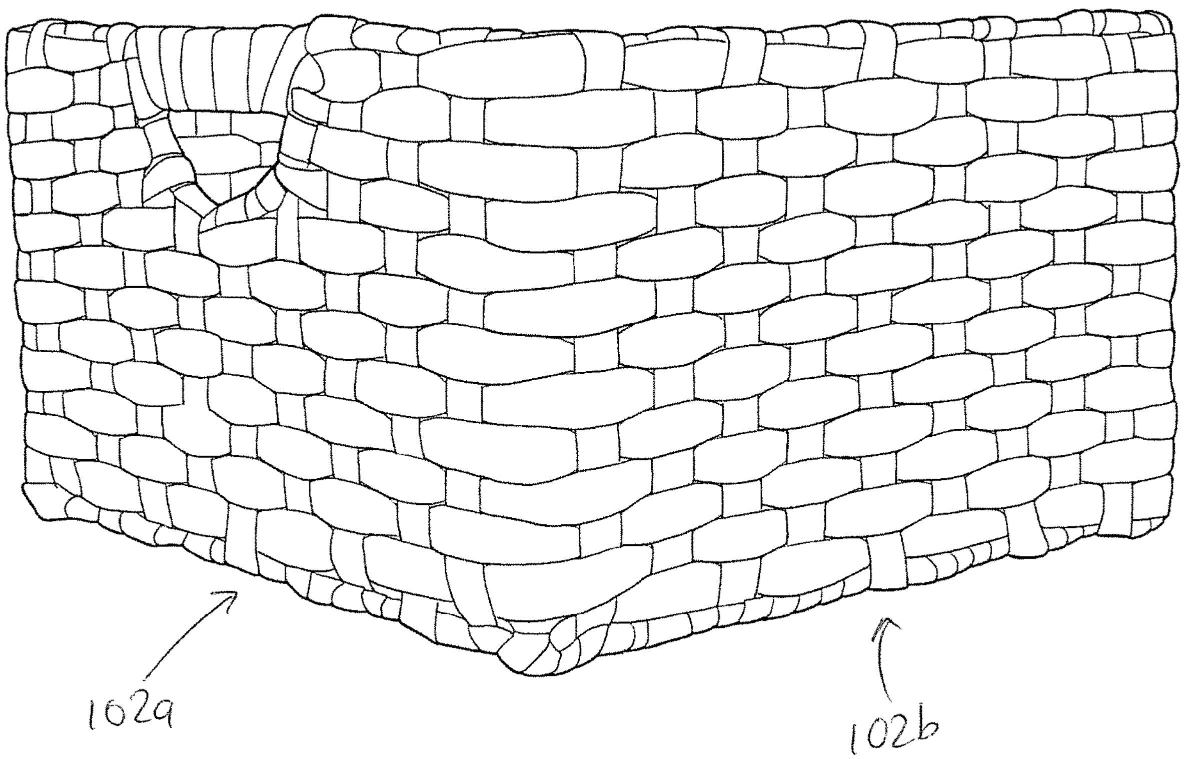
FIG. 4 is a side corner view of one corner of the basket of FIG. 1.

Each side member 102-102*d* is woven by one or more strips 112 of material using a weave pattern that is shown in greater detail in FIG. 3, and which is woven according to the weave method shown in FIGS. 6-12 and described below. As best shown in FIG. 4, the weave pattern covers each pivoting connection at the four corners of the basket 100. The strip of material used for weaving is preferably made of a flexible, and more preferably, elastic, material because it is fully stretched (especially at four corners). Examples include polyethylene, paper cord, rope, bamboo and rattan.

A base 114 that is also made of a frame member (not shown) that is woven using the weave pattern of FIG. 3 according to the weaving steps shown and described below has one side that is pivotably connected to a bottom side 118*a*-118*d* of one of the side members 102*a*-102*d* by one or more ringed connectors 116. See FIGS. 2 and 14. The ring connectors 116 can also be made from the same material that is used to form the weave pattern. A plurality of angled members 128 can be provided in spaced-apart manner along the bottom sides of each side member 102*a*-102*d* so that the base 114 can be seated on this border of angled members 128, thereby preventing the base 114 from being pivoted outside the interior defined by the four side members 102*a*-102*d*. Each of the angled members 128 can be a metal strip that is bent to form the angled configuration.

Figure 6:
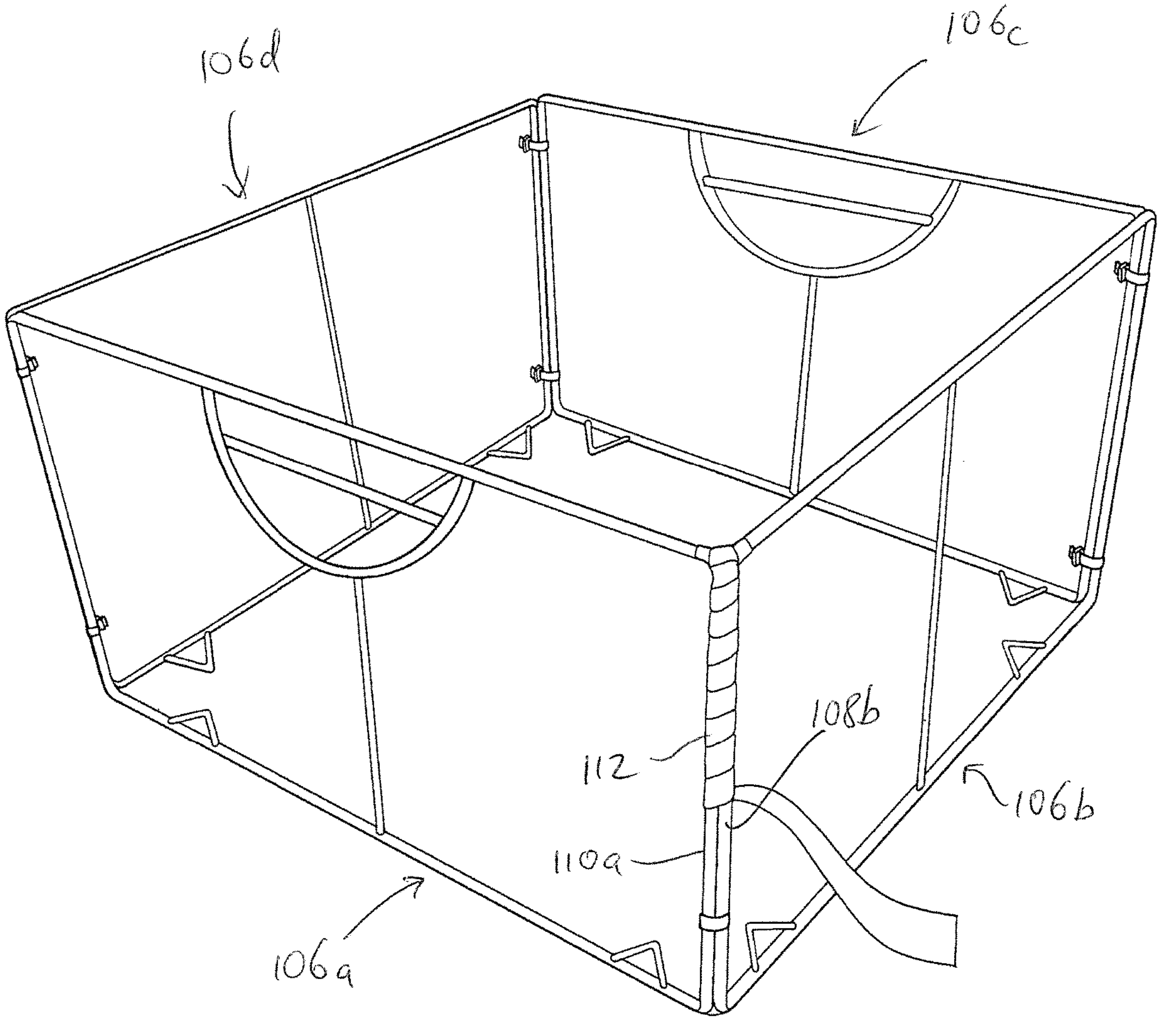
FIGS. 6-12 illustrate how the frame members of FIG. 5 are woven by one or more strips of material.
Figure 7:
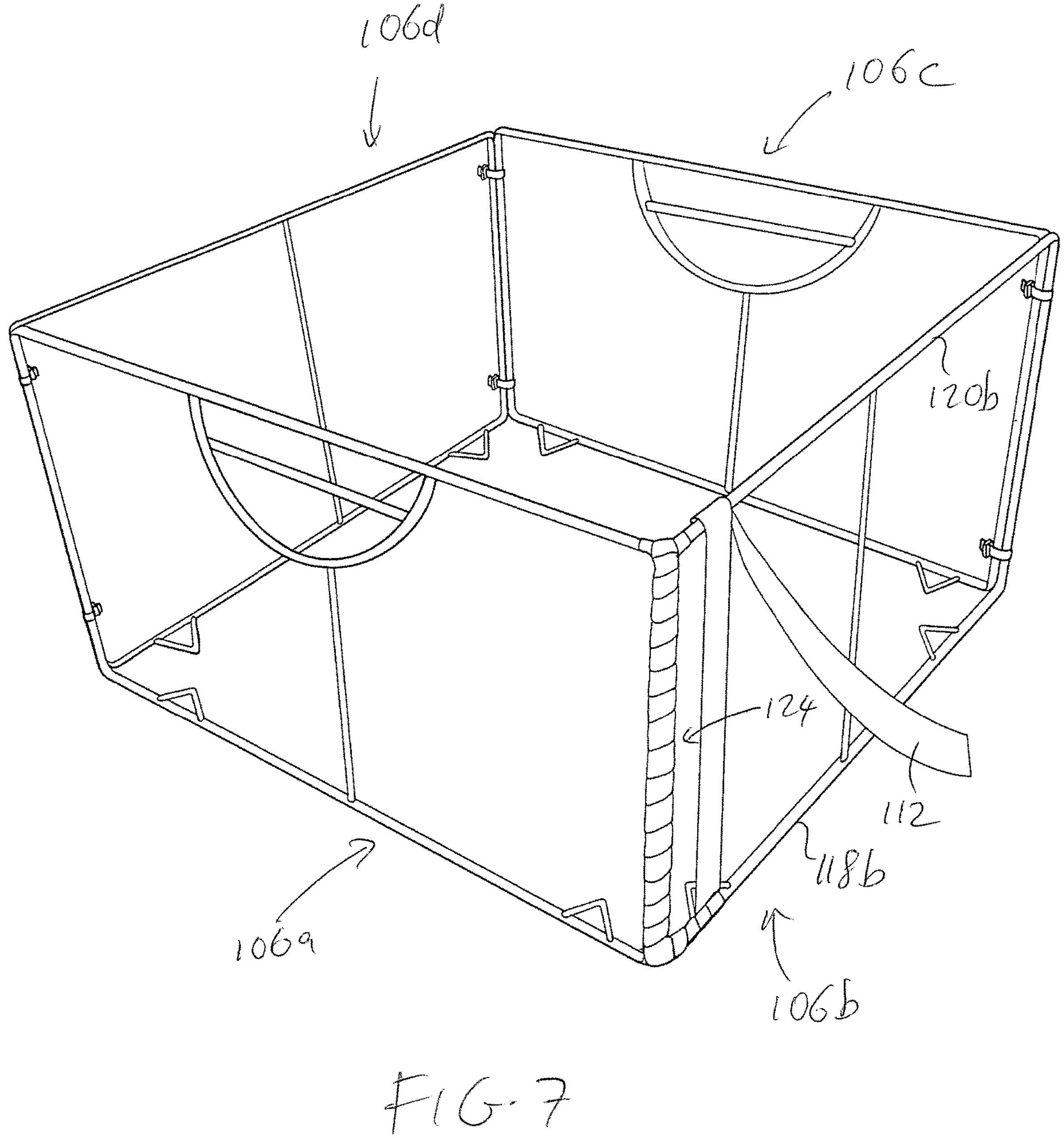

FIGS. 6-12 illustrate the method of weaving:

Step One: Connecting two Adjacent Sides. The weaving method begins with first weaving the two adjacent sides (e.g., right side 110*a* and left side 108*b*) of two adjacent frame members (e.g., 106*a* and 106*b*). As shown in FIG. 6, a strip 112 of material is wound around the two adjacent sides 110*a* and 108*b* to completely cover the connection between these two sides 110*a* and 108*b*.

Step Two: Forming Vertical Bands. The same strip 112 is then wound around the bottom side 118*b* of the frame member 106*b* for a couple of wraps and then is extended from the inside of the bottom side 118*b* to the outside of the top side 120*b* with a small vertical space 124 between the left side 108*b* and the extended band of the strip 112. See FIG. 7. The same strip 112 is then wound around the top side 120*b* for a couple of wraps and then is extended from the inside of the top side 120*b* to the outside of the bottom side 118*b* with another small vertical space 124 between the two adjacent bands of the strip 112. The same strip 112 is then wound around the bottom side 118*b* for a couple of wraps and then is extended from the outside of the bottom side 118*b* to the inside of the top side 129*b* with another small vertical space 124 between the two adjacent bands of the strip 112. These vertical bands can be formed for the entire frame member 106*b*, and then Step One can be repeated using the same strip 112 for the two adjacent sides (e.g., right side 110*b* and left side 108*c*) of the next two adjacent frame members (e.g., 106*b* and 106*c*).

It should be noted that the vertical wrap method involves an inside-to-outside (or outside-to-inside) wrap from one of the top side and bottom side to the other of the bottom side and top side.

Figure 8:
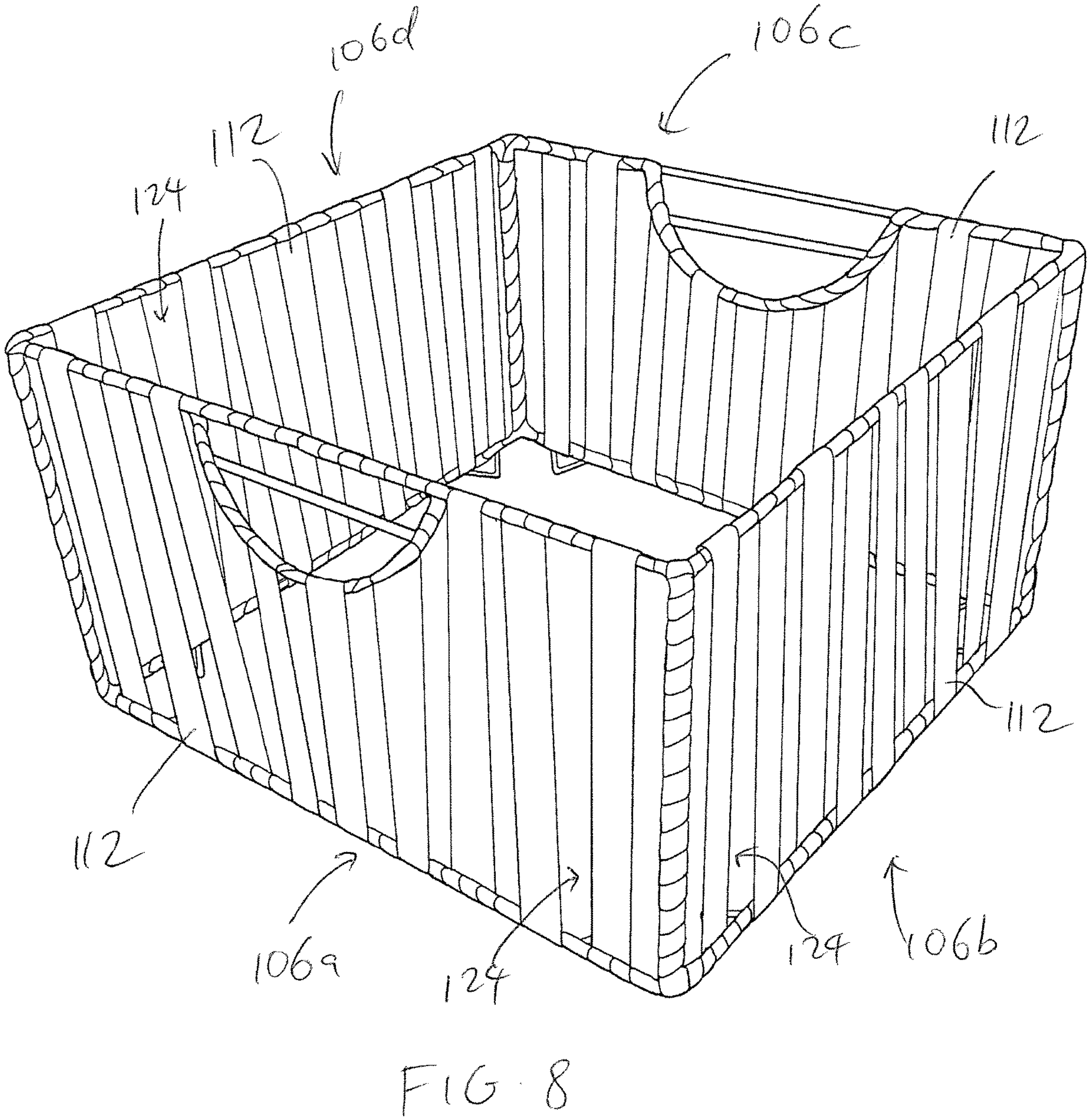

This process of wrapping around the top sides 120*a*-120*d* and the bottom sides 118*a*-118*d* to form bands of the strip 112 with vertical spaces 124 between adjacent bands of the strip 112 is repeated for the remaining two frame members 106*c* and 106*d*. The result is shown in FIG. 8 where all four frame members 106*a*-106*d* have been wrapped with the vertical bands. At the locations of the handles 104*a* and 104*c*, the strip 112 is wrapped around the curved portion of the handle which functions like a top side 120*a*-120*d*.

Figure 9:
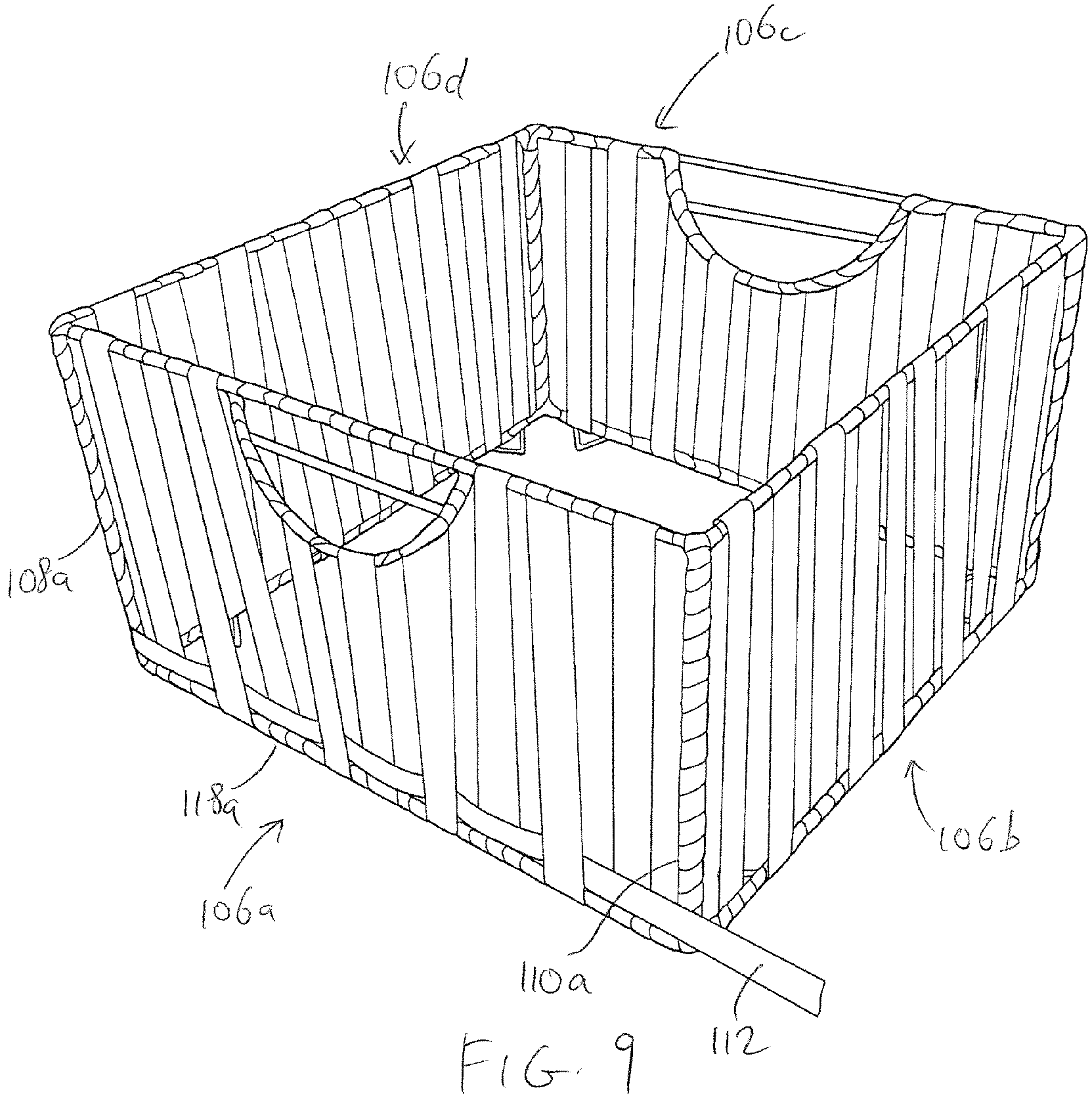
Figure 10:
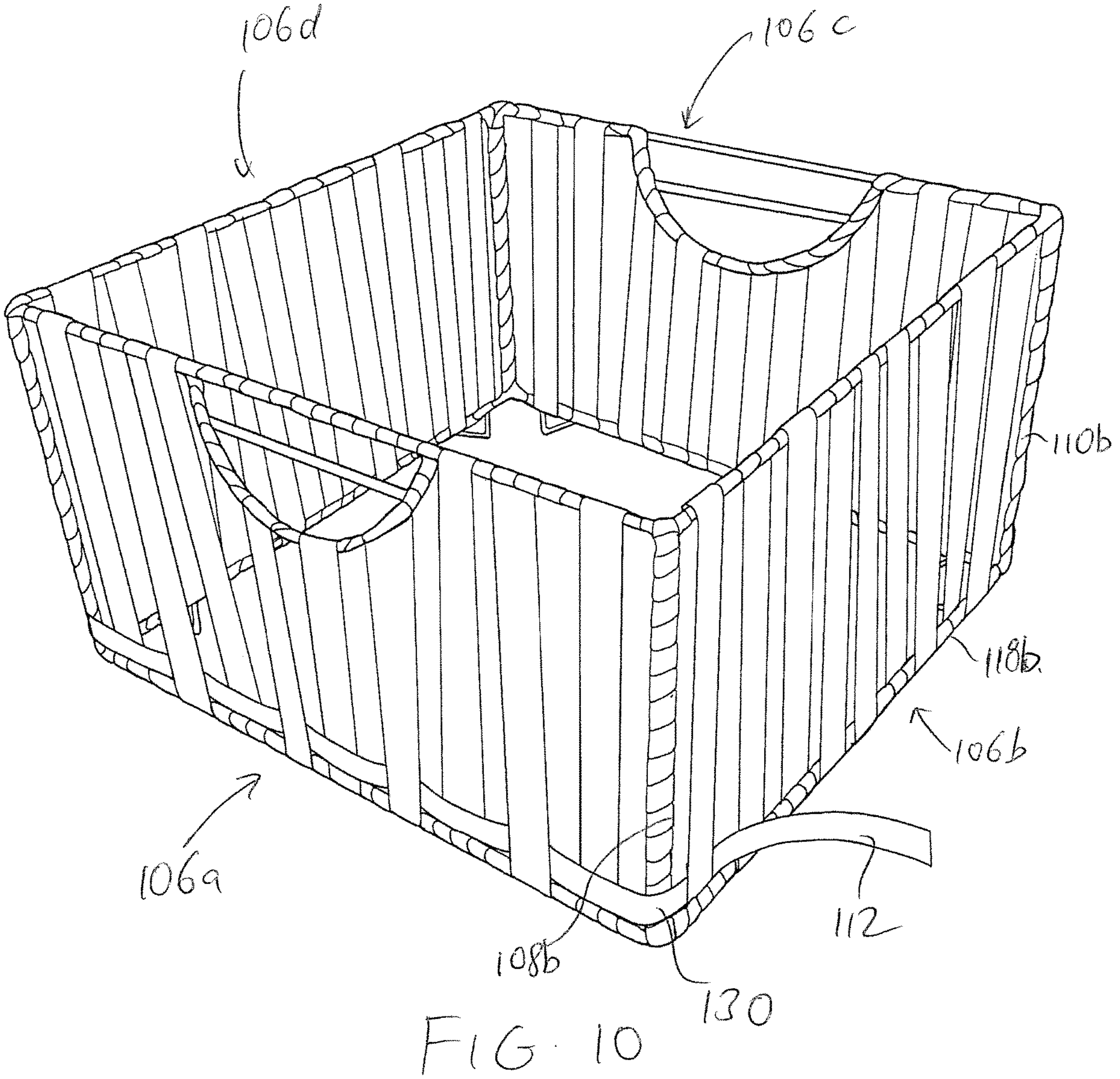
Figure 11:
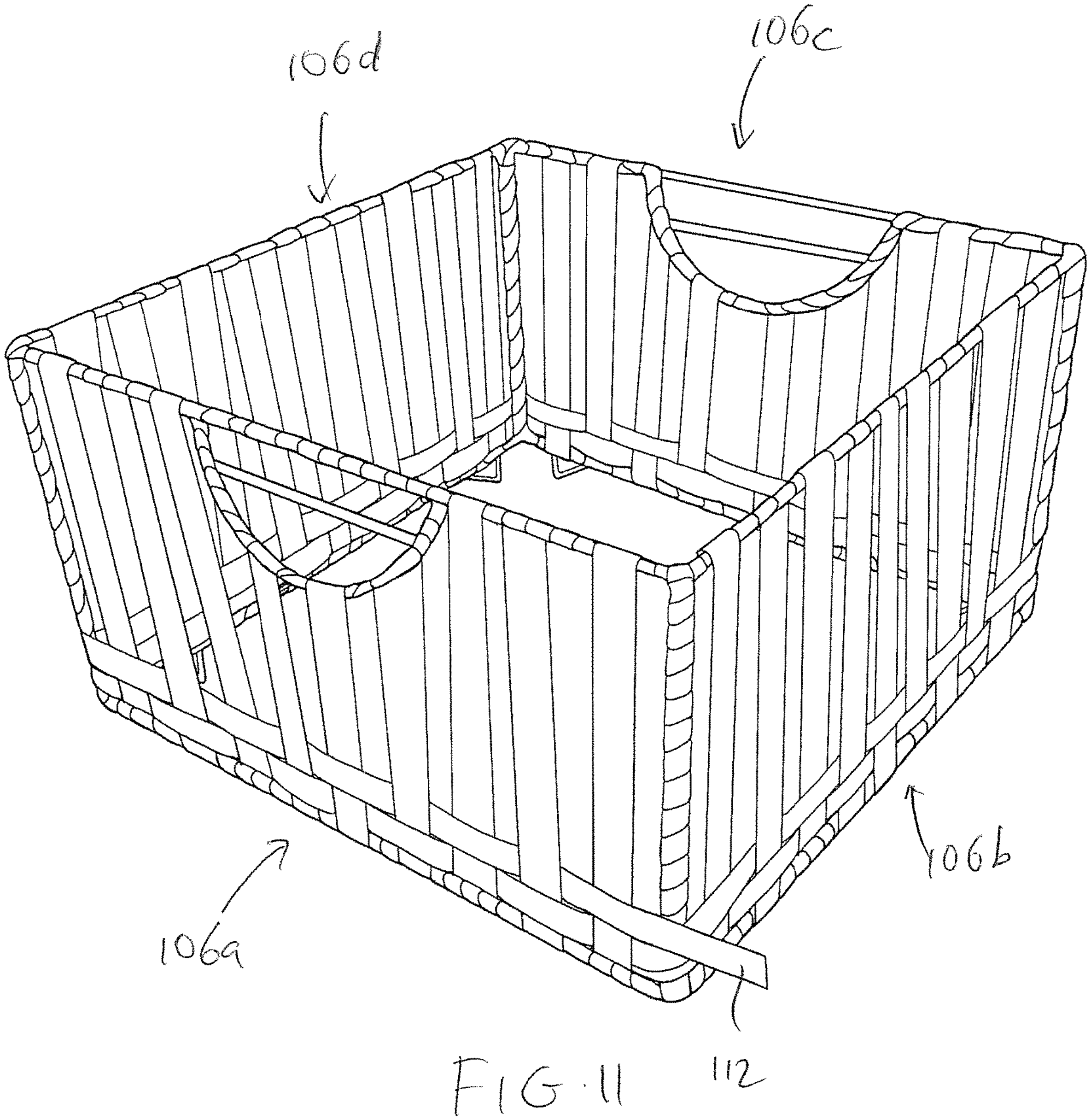
Figure 12:
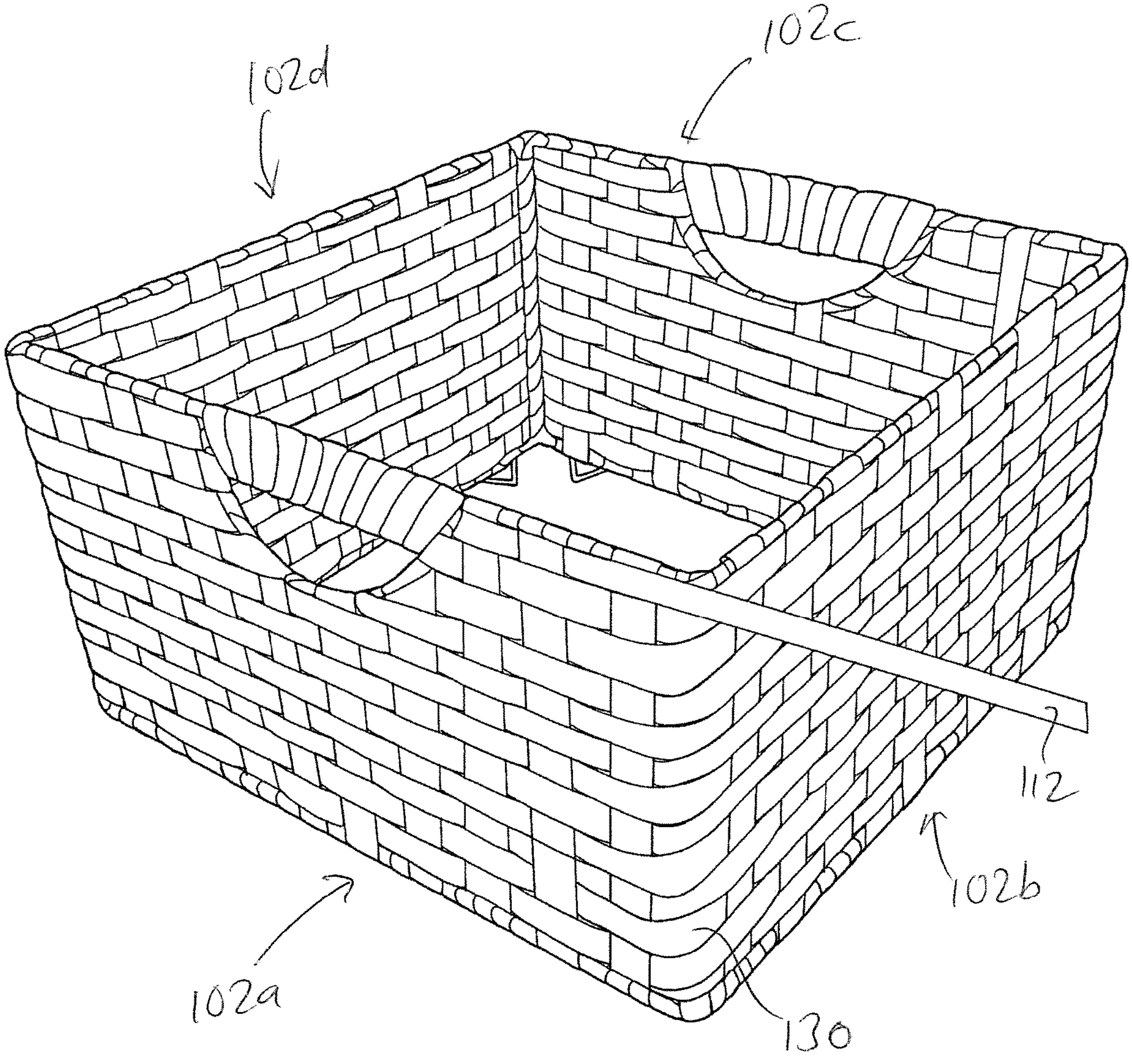

Step Three: Forming Horizontal Bands. Referring to FIG. 9, the same strip 112, or a new strip 112, is threaded along the bottom side 118*a* of the frame member 106*a* from the left side 108*a* towards the right side 110*a*. The threading involves passing the strip 112 in front of one vertical band and then behind the adjacent vertical band in alternating fashion. When the strip 112 reaches the right side 110*a*, it wraps around the pivoting connection between the sides 110*a* and 108*b* (see bend 130 in FIG. 10) and then the strip 112 is now threaded along the bottom side 118*b* of the frame member 106*b* from the left side 108*b* towards the right side 110*b*. This threading and wrapping continues around the other frame members 106*c* and 106*d* to form a first horizontal row or band of the strip 112, as shown in FIG. 11, and then the strip 112 is threaded and wrapped in the same manner to form a second horizontal row or band of the strip 112. The threading is preferably done so that the vertical bands that are inside the first horizontal band are now outside the second horizontal band, and the vertical bands that are outside the first horizontal band are now inside the second horizontal band, so as to provide an alternating "in" and "out" weave for adjacent rows of horizontal bands and adjacent vertical bands. This process is continued until all the horizontal bands are formed, as shown in FIG. 12. The resulting weave pattern is best shown in FIG. 3.

As shown in FIG. 12, the horizontal bands are wrapped in a manner where the bend 130 at each corner covers any vertical space that may exist if each frame member 106*a*-106*d* were to be woven separately.

Figure 13:
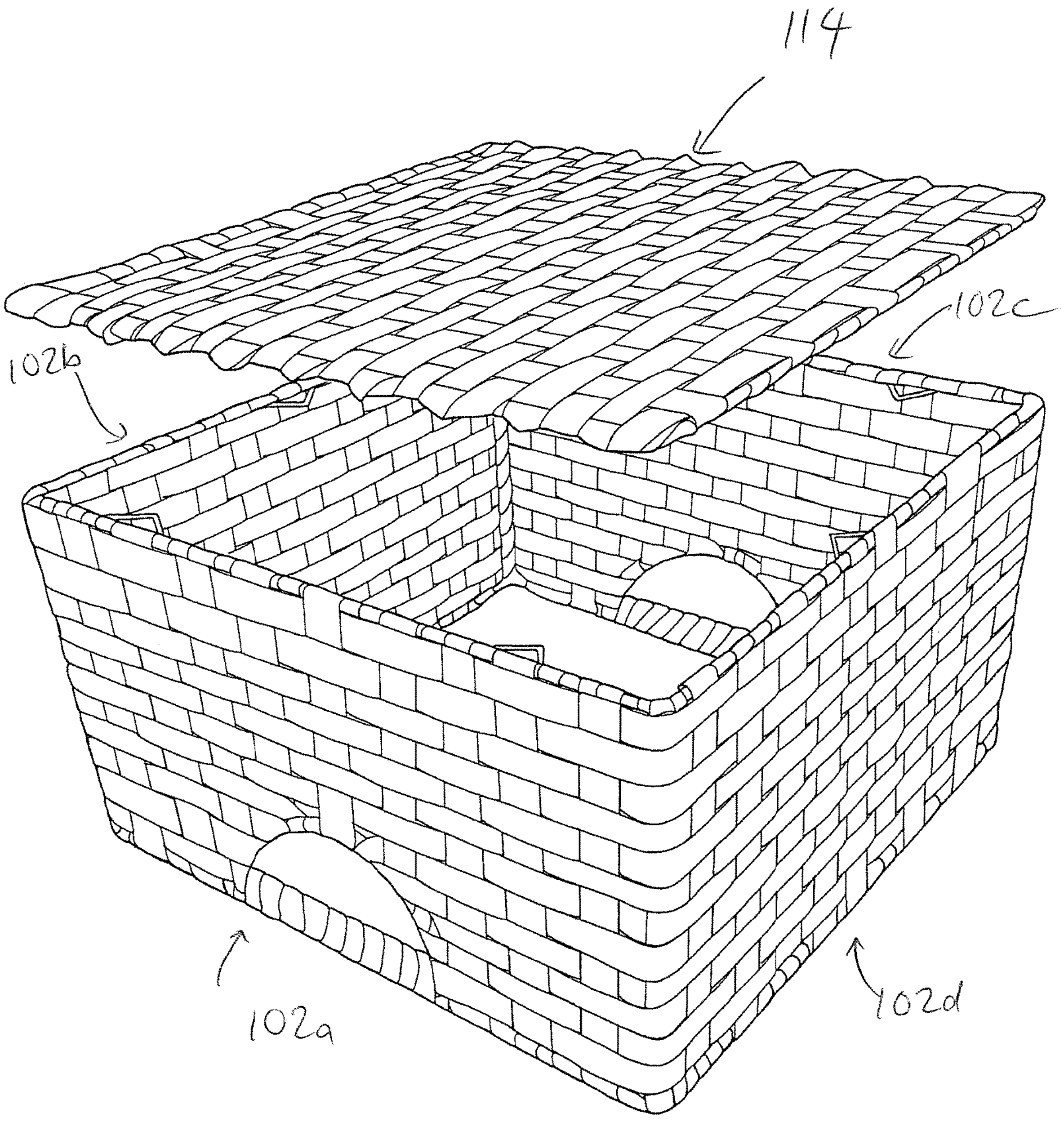
FIG. 13 is an exploded bottom perspective view of the basket of FIG. 1.
Figure 14:
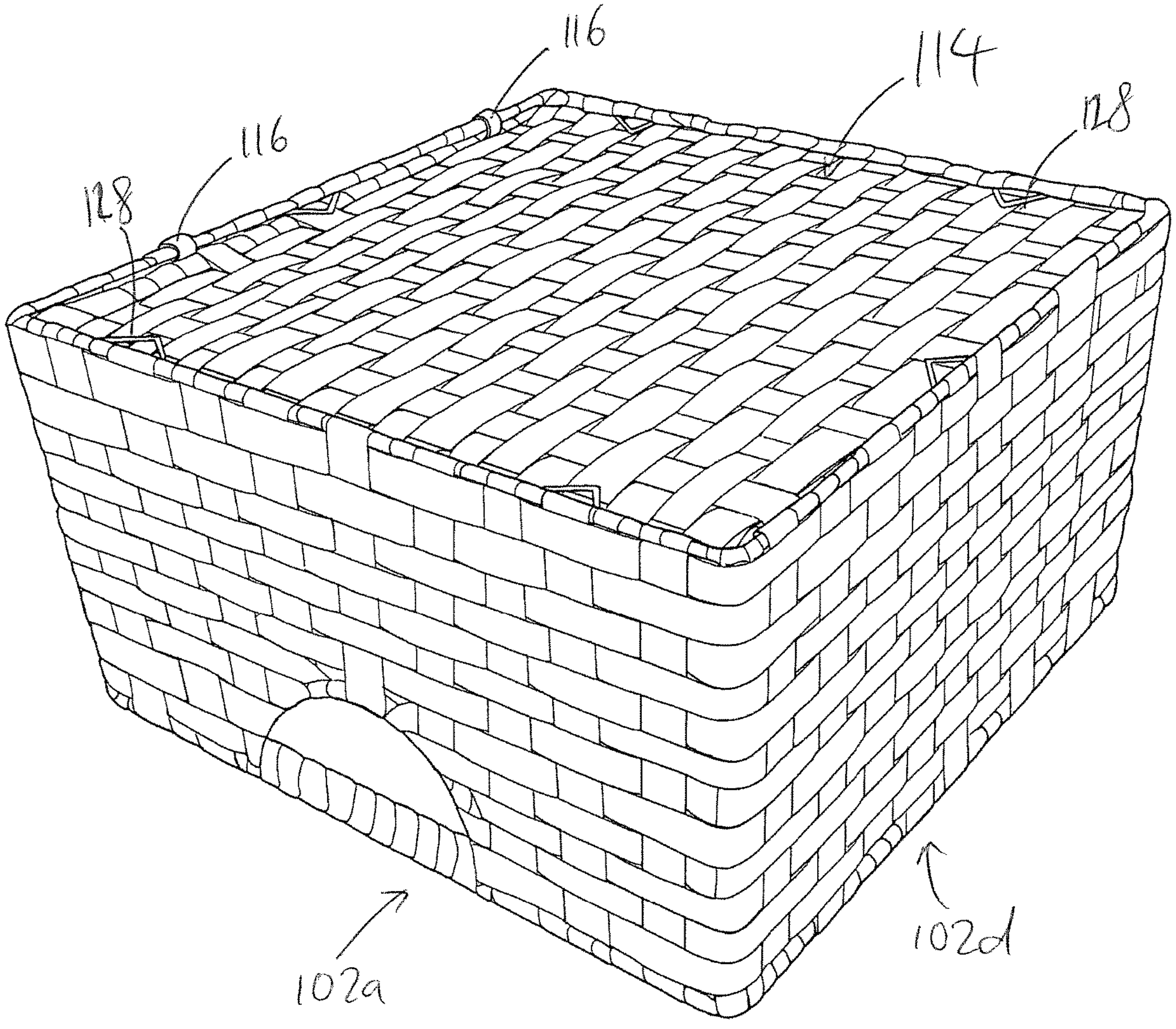
FIG. 14 is a bottom perspective view of FIG. 13 showing the base pivotably connected to the four side members.

FIGS. 13 and 14 show the provision of the base 144 and how it is secured to the bottom sides 118*a*-118*d*.

Figure 15:
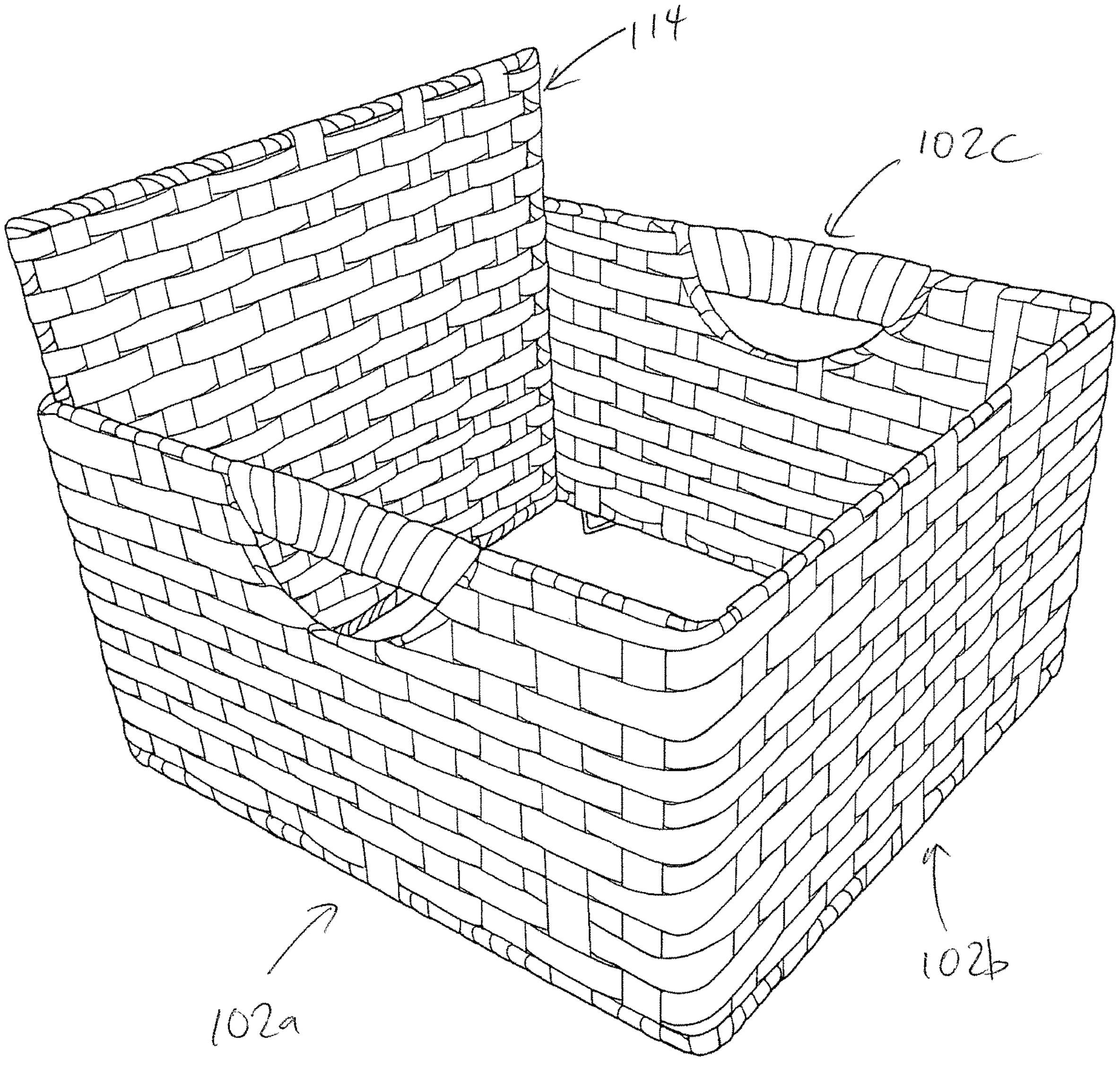
FIGS. 15-16 illustrate how the basket of FIG. 1 is collapsed.
Figure 16:
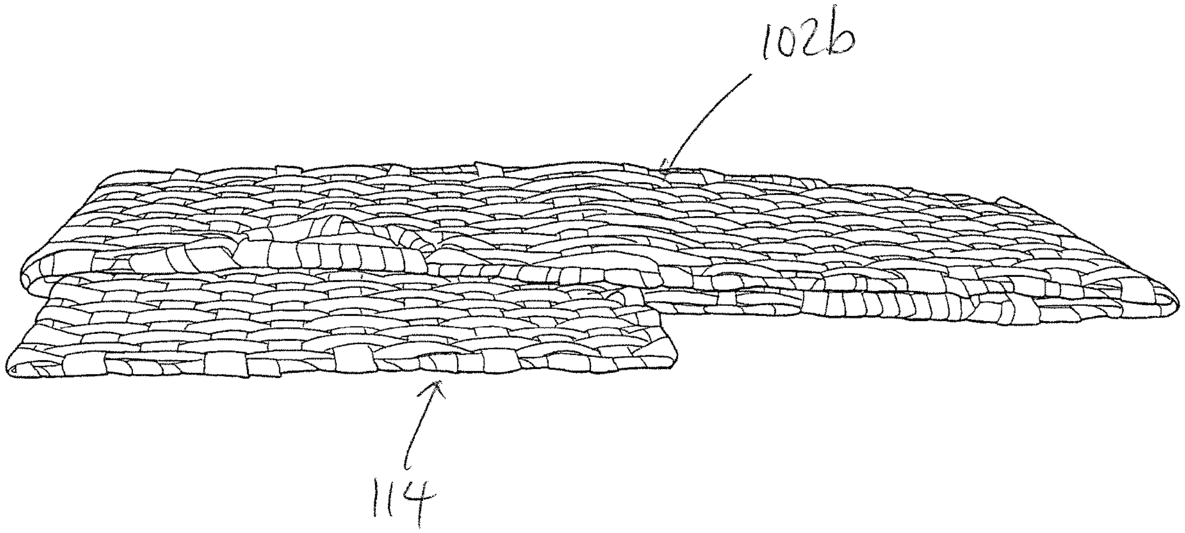

FIGS. 15-16 show how the basket 100 is folded and collapsed. The base 114 is first pivoted about the ring connectors 160 towards the interior formed by the four side members 102*a*-102*d* so that the base 114 is positioned against the inside of the side member 102*d*. See FIG. 15. The entire structure is then folded about the pivoting connections of the adjacent sides so that the four side members 102*a*-102*d* can be positioned flat against each other (with the base 114 positioned inside) to form a stack of side members 102*a*-102*d* and the base 114.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of making a collapsible woven basket, comprising:

providing a first frame member, a second frame member, a third frame member and a fourth frame member, each frame member having a left side, a right side, a bottom side and a top side;

connecting the right side of each frame member to the left side of an adjacent frame member to form pivoting connections by winding a strip of material around the adjacent right side and left side of the adjacent frame members to completely cover the connection between the adjacent right side and left side;

forming vertical bands by:

wrapping the strip of material from the connection around the bottom side of the first frame member adjacent the left side of the first frame member to form a vertical strip of material, extending the vertical strip of material to the top side of the first frame member to create a first vertical band, wrapping the vertical strip of material around the bottom side of the first frame member, extending the vertical strip of material back to the bottom side of the first frame member to create a second band with a vertical space defined between the first and second bands, and repeating the above wrapping and extending steps until vertical bands are formed for all the frame members;

forming horizontal bands by:

starting from adjacent the bottom side of the first frame member, threading a horizontal strip of material inside and outside adjacent vertical bands in the first frame member, and then continuing to thread the horizontal strip of material inside and outside adjacent vertical bands in the second frame member, the third frame member and the fourth frame member, and repeating the step of threading a horizontal strip of material until horizontal bands are formed from the bottom side to the top side for each frame member;

wherein each horizontal band covers each pivoting connection between adjacent frame members.

2. The method of claim 1, further including the step of pivotably connecting a base to the bottom side of the fourth frame member.

3. The method of claim 1, wherein the steps of wrapping the strip of material from the connection around the bottom side of the first frame member and extending the vertical strip of material to the top side of the first frame member to create a first vertical band includes wrapping a vertical strip of material around the bottom side of the first frame member and extending the vertical strip of material from the inside of the bottom side of the first frame member to the outside of the top side of the first frame member.

* * * * *